United States Patent [19]

Hayes

[11] Patent Number: 4,896,531

[45] Date of Patent: Jan. 30, 1990

[54] SIDEWALL APPEARANCE MONITOR

[75] Inventor: Richard H. Hayes, Talmadge, Ohio

[73] Assignee: Eagle-Picher Industries, Inc., Cincinnati, Ohio

[21] Appl. No.: 255,394

[22] Filed: Oct. 11, 1988

[51] Int. Cl.$^4$ ............................................ G01M 17/02
[52] U.S. Cl. ..................................................... 73/146
[58] Field of Search ................................. 73/146, 105

[56] References Cited

U.S. PATENT DOCUMENTS

| | | | |
|---|---|---|---|
| 4,258,567 | 3/1981 | Fisher, III | 73/146 |
| 4,311,044 | 1/1982 | Marshall et al. | 73/146 |
| 4,402,218 | 9/1983 | Engel | 73/146 |
| 4,440,018 | 4/1984 | Christie | 73/146 |
| 4,475,384 | 10/1984 | Christie | 73/146 |
| 4,783,992 | 11/1988 | Ishibashi | 73/146 |

Primary Examiner—Donald O. Woodiel
Attorney, Agent, or Firm—Wood, Herron & Evans

[57] ABSTRACT

A sidewall appearance monitor for a tire uniformity machine. The tire uniformity machine has an upper chuck, a lower chuck, and a conveyor that brings a tire between the two chucks. The lower chuck raises the tire to the upper chuck where it is inflated and rotated by engagement with a loadwheel for the uniformity measurement. Upper and lower sidewall probes are provided with means for swinging the lower sidewall probe between an operative position below the tire and an inoperative position above and to the side of the tire whereby the tire may be lowered and conveyed horizontally from the machine without interference from the probe.

4 Claims, 1 Drawing Sheet

SIDEWALL APPEARANCE MONITOR

This invention relates to a tire sidewall appearance monitor, that is, apparatus that monitors the uniformity of a tire sidewall. Preferably, the monitoring apparatus is employed in conjunction with a tire uniformity machine.

A tire uniformity machine includes a vertically fixed upper chuck and a vertically movable lower chuck. A conveyor is provided to convey tires, one at a time, between the upper and lower chucks. When in position, the lower chuck engages the lower bead of the tire and raises the tire until the upper bead seats on the upper chuck. There, the tire is inflated and engaged by a loadwheel. The loadwheel has gauges associated with it to measure the uniformity of the tire as the tire is rotated against the loadwheel.

The objective of the present invention is to measure the appearance of the sidewalls of the tire, that is, to determine whether the sidewalls maintain a uniform distance in the axial direction from a datum as the tire is rotated.

More specifically, the objective of the invention has been to mount distance probes for measuring sidewall uniformity so that the probes do not interfere with the movement of the tire into and out of the uniformity machine, but which are in operative position when the uniformity measurement is made. The objectives of the invention are attained by mounting an upper probe adjacent the upper chuck and mounting a lower probe on an elongated vertical arm. The upper end of the arm for the lower probe is pivotally mounted and has a motor associated with it to swing the arm from a vertical operative position to an upper horizontal position out of the way of the tire. When in its inoperative position, the tire can be raised and lowered in the uniformity machine and can be moved horizontally on its conveyor without interference from the probe.

The invention is adapted to be used in conjunction with a fixed tire tread probe that is suspended from the frame that supports the lower sidewall probe arm. To accommodate the swinging movement to an inoperative position, the probe support is formed as two arms that are horizontally spaced apart. As the lower probe is swung upwardly, the two arms straddle the tread probe and swing upwardly past it.

The several features and objectives of the invention will become more readily apparent from the following detailed description taken in conjunction with the accompanying drawings in which.

Figure 1:
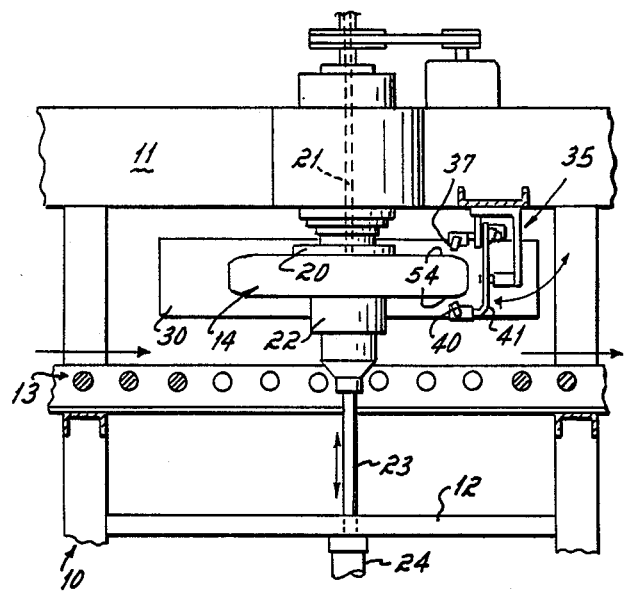
FIG. 1 is a diagrammatic side elevational view of a tire uniformity machine employing the present invention.

The tire uniformity machine has a frame 10 including an upper horizontal support structure or beam 11 and a base 12. A conveyor 13 disposed between the upper beam 11 and base 12 is provided to convey a tire 14 into the uniformity machine. An upper bead-engaging chuck 20 is mounted on the beam 11. It is vertically fixed but rotatable. A passageway 21 is provided for introducing air under pressure to the chuck to inflate the tire 14 engaged by the chuck.

A lower bead-engaging chuck 22 is mounted on a rod 23 which has a piston slidable in a cylinder 24 to raise and lower the lower chuck. A loadwheel 30 is mounted on the frame and is adapted to be moved in and out of engagement with the tire to cause the rotation of the tire. Mechanism, not shown, is provided to rotate the loadwheel and to take load measurements from the loadwheel by which the uniformity of the tire is measured.

In the general operation of the uniformity machine, a tire 14 is conveyed on the conveyor 13 to a position between the two chucks. It is centered over the lower chuck. The lower chuck is raised to engage the tire and convey it into engagement with the upper chuck 20. When the beads of the tire are seated on the chucks, air through passage 21 is introduced to inflate the tire to the desired pressure. The loadwheel 30 is brought into engagement with the tire to rotate the tire and to take the uniformity measurements. When the measurements are complete, the loadwheel is disengaged from the tire, the lower chuck is lowered to drop the tire on the conveyor, and the tire is conveyed away while a new tire is conveyed into position.

Figure 3:
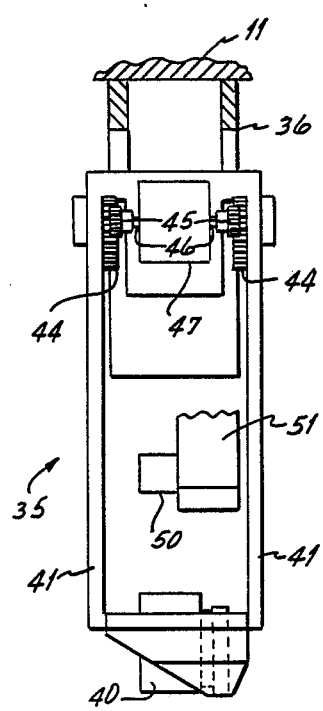
FIG. 3 is an end elevational view of the apparatus of FIG. 2 taken along lines 3—3 of FIG. 2.
Figure 2:
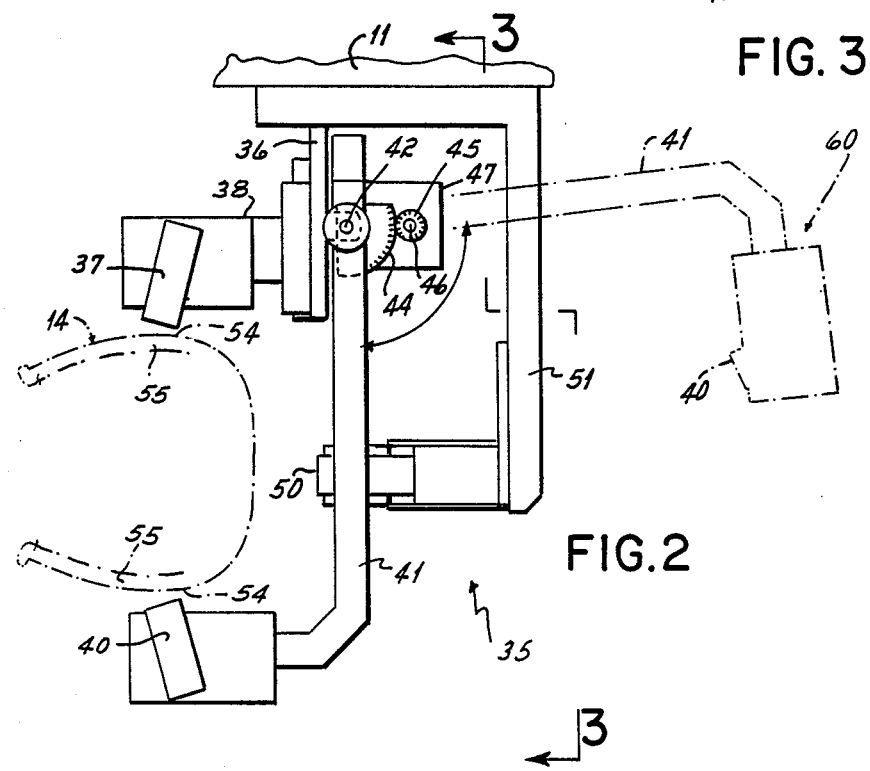
FIG. 2 is a fragmentary side elevational view showing the sidewall monitoring probes.

Mounted on the beam 11 at the exit side of the tire uniformity machine is the sidewall appearance monitor 35. The monitor is best understood by reference to FIGS. 2 and 3. A bracket 36 depends from the beam 11. An upper probe 37 mounted on a support 38 is fixed to the bracket 36. A lower probe 40 is mounted on the lower end of a pair of arms 41 that are spaced apart horizontally. The upper ends of the arms 41 are mounted on a shaft 42. The shaft is rotatably mounted in the bracket 36. An arcuate rack or partial gear 44 is fixed to each of the arms 41. The racks 44 have teeth that engage gears 45 that are fixed to the shaft 46 projecting from the ends of a rotary pneumatic motor 47.

Optionally, a tread probe 50 is supported at the lower end of a vertical arm 51, the upper end of arm 51 being fixed to the beam 11.

The probes are preferably optical probes that do not require contact with the tire and which measure the distance the surface 54 of the sidewall 55 of the tire is from the probe at any instant of measurement. Alternatively, a capacitance probe or a probe that engages the tire could be employed. The probes are preferably provided with automatic position adjusting means that can be set for any size of tire. The adjustment mechanism is conventional and is not shown. The probe 50 is provided for measuring tread runout and is not a part of the sidewall uniformity measuring system. However, it is positioned, as shown, between the two arms 41 of the lower probe support for the purpose of compact mounting of the measuring instrumentation. By mounting the lower probe 40 on the two spaced-apart arms 41, the probe 40 and its support can be swung past the probe 50 without interference.

In the operation of the invention, the probe is in a raised position shown at 60 in broken lines. There is below the assembly of probes a space at least 12 inches high above the conveyor line. Tires are conveyed by the conveyor between the two chucks. The lower chuck is raised to bring the tire to the position shown in FIGS. 1 and 2. After the tire has been raised and inflated, the motor 47 is actuated to swing the probe to its lower position below the tire with the arms 41 in a vertical attitude (solid line position of FIG. 2). Thus positioned, the uniformity measurements are taken as the tire is rotated between the probes.

After the uniformity measurement has been taken, the loadwheel is disengaged and rotation of the tire stops. The probe is swung to its inoperative position (broken line position 60 of FIG. 2) wherein the arms 41 are substantially horizontal. In this attitude, the probe 40 is out of the way of the tire when it is lowered on the chuck 22 and it is out of the way of the tire when the tire exits underneath the probe assembly at the conclusion of the operation.

From the above disclosure of the general principles of the present invention and the preceding detailed description of a preferred embodiment, those skilled in the art will readily comprehend the various modifications to which the present invention is susceptible. Therefore, I desire to be limited only by the scope of the following claims and equivalents thereof:

I claim:

1. A sidewall appearance monitor comprising:
    a frame,
    a fixed upper chuck and a vertically-movable lower chuck for supporting a tire on said frame, means for inflating said tire, means for rotating said tire when inflated,
    an upper probe mounted on said frame adjacent the upper sidewall of a tier,
    a lower probe normally adjacent the lower sidewall of a tire,
    means for mounting said lower probe for movement between an operative position adjacent the lower sidewall of a tire and an inoperative position to one side of said tire,
    whereby said lower chuck may move downwardly to release the tire and the tire may be moved laterally away from said chucks without interference from said lower probe.

2. A sidewall appearance monitor as in claim 1 in which said lower probe mounting means comprises:
    an elongated support arm,
    a probe projecting from one end of said support arm,
    means mounting the upper end of said support arm for pivotal movement between a vertical operative position and a horizontal inoperative position.

3. A sidewall appearance monitor as in claim 2 in which said means for pivoting said arm comprises:
    an arcuate rack fixed to the upper end of said elongated arm,
    a gear engaging said rack,
    and a pneumatic motor for rotating said gear to pivot said arm between its two positions.

4. A sidewall appearance monitor comprising:
    a frame,
    a fixed upper chuck and a vertically-movable lower chuck for supporting a tire on said frame, means for inflating said tire, means for rotating said tire when inflated,
    a tread probe and support therefor depending vertically from said frame,
    an upper probe mounted on said frame adjacent the upper sidewall of a tire,
    a lower probe normally adjacent the lower sidewall of a tire,
    a pair of normally vertical support arms horizontally-spaced from each other and straddling said tread probe and support therefor, said lower probe being mounted between the lower ends of said support arms,
    means for mounting the upper ends of said support arms to swing said support arms between a vertical operative position and a horizontal inoperative position above the level of said tire,
    whereby said lower chuck may move downwardly to release the tire and the tire may be moved laterally away from said chucks without interference from said lower probe.

* * * * *